May 14, 1940.　　　　　G. N. ALBREE　　　　　2,200,869
TELESCOPE SIGHT MOUNTING FOR FIREARMS
Filed Jan. 19, 1939　　　2 Sheets-Sheet 1
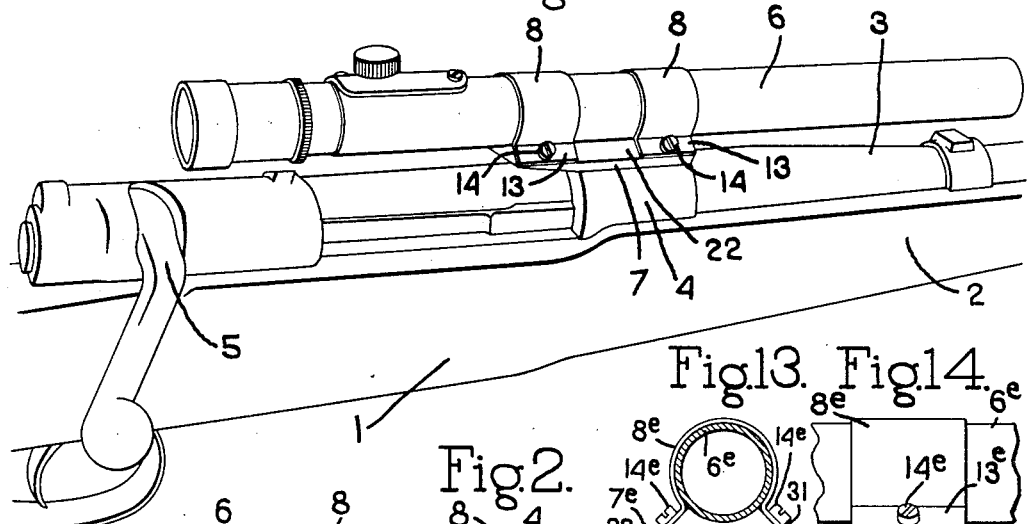
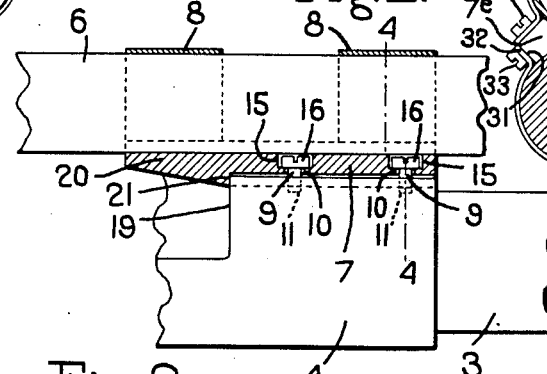
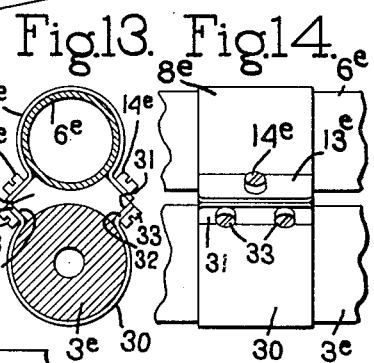
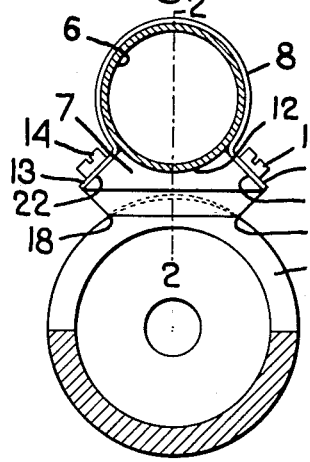
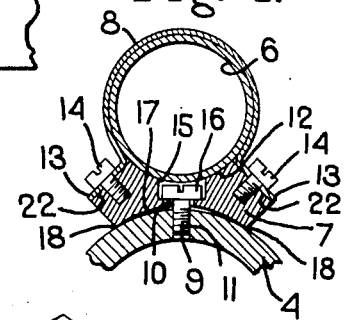
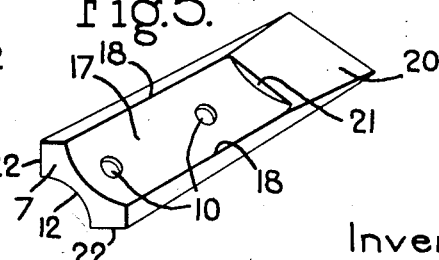
Inventor.
George Norman Albree
by Heard Smith & Tennant.
Attys.

May 14, 1940.   G. N. ALBREE   2,200,869
TELESCOPE SIGHT MOUNTING FOR FIREARMS
Filed Jan. 19, 1939   2 Sheets-Sheet 2
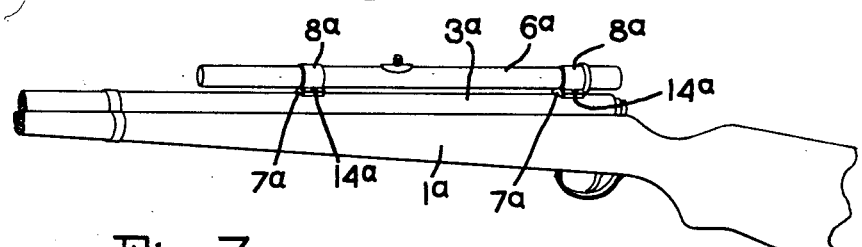
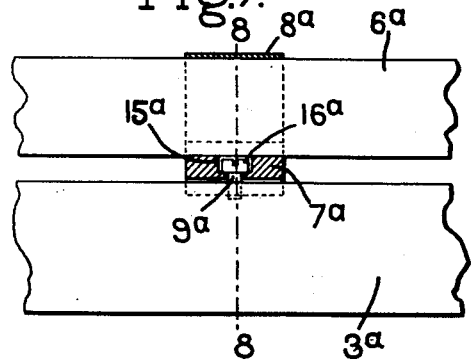
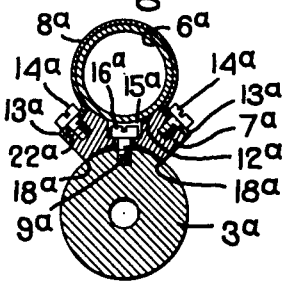
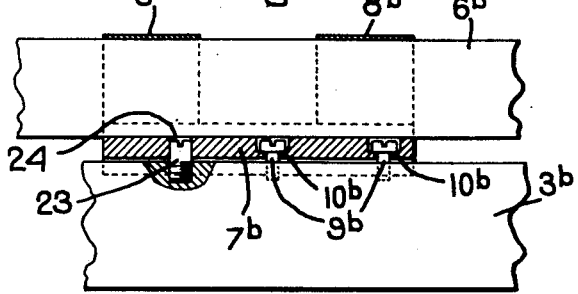
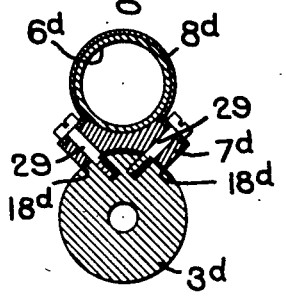
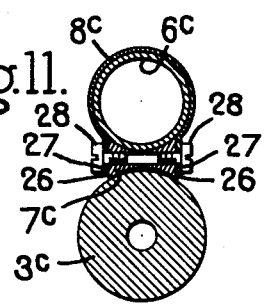
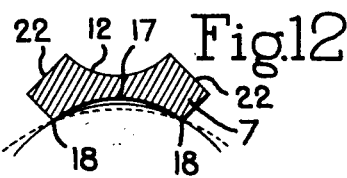
Inventor.
George Norman Albree
by Howard Smith & Tennant.
Attys.

Patented May 14, 1940

2,200,869

UNITED STATES PATENT OFFICE 2,200,869

TELESCOPE SIGHT MOUNTING FOR FIREARMS

George Norman Albree, Concord, Mass.

Application January 19, 1939, Serial No. 251,696

8 Claims. (Cl. 33—50)

This invention relates to a telescope sight mounting designed principally for rifled firearms, although the invention is capable of use with guns of other types.

One of the objects of the invention is to provide a sight mounting which is adapted for use with various types of rifles and which requires only the use of a screwdriver for attaching it to many models.

A further object of the invention is to provide a sight mounting which will be self-alining when it is applied to the rifle, thereby eliminating the necessity for making any adjustments to line up the telescope sight after the latter has been attached to the rifle.

A further object of the invention is to provide a sight mounting which, when attached to a firearm, has a high degree of stability.

A further object of the invention is to provide a sight mounting which is so constructed that the recoil of the gun, when the latter is discharged, will be transmitted to the mounting by means other than the clamping screws by which the mounting is clamped to the firearm, thereby relieving the clamping screws from any recoil stresses.

A further object of the invention is to provide a sight mounting which is compact and neat in appearance and which is free from projecting parts that are likely to interfere with handling or manipulating the rifle.

Further objects of the invention are to improve sight mountings for rifles in various particulars which will be more fully hereinafter set forth.

In the drawings wherein I have illustrated some embodiments of my invention;

Fig. 1 is a perspective view showing a telescope sight secured to a rifle by means of my improved mount;

Fig. 2 is a fragmentary side view with the sight mounting shown in section on the line 2—2, Fig. 3;

Fig. 3 is a rear view of the sight mounting showing the telescope in section;

Fig. 4 is a section on the line 4—4, Fig. 2;

Fig. 5 is an underside perspective view of the base portion of the mounting illustrated in Figs. 1, 2 and 3;

Fig. 6 shows a different embodiment of the invention by which a telescope sight may be secured directly to the barrel of the rifle;

Fig. 7 is a fragmentary side view of a rifle barrel with the telescope mounted thereon and showing my improved mount in section;

Fig. 8 is a section on the line 8—8, Fig. 7;

Fig. 9 is a view similar to Fig. 7 but showing a different embodiment of the invention;

Fig. 10 is a sectional view similar to Fig. 8 but showing a different way of attaching the mount to the rifle barrel;

Fig. 11 is a section similar to Fig. 8 but showing a still different embodiment of the invention;

Fig. 12 is a view illustrating the construction of the mount by which it is automatically lined up when applied to the barrel or receiver ring of a rifle;

Fig. 13 is a view similar to Fig. 8 but showing a still different embodiment of the invention;

Fig. 14 is a side view of Fig. 13.

Referring first to Fig. 1, I indicates a portion of a receiver-ring bolt-action rifle having the stock 2, the barrel 3, the receiver ring 4 into which the barrel is screwed and the usual bolt action indicated generally at 5. 6 indicates a telescope sight which is secured to the receiver ring 4 by means of my improved sight mounting.

This mounting means comprises a base member or bed-block 7 which is secured to the receiver ring 4, and one or more clamping bands 8 of resilient metal by which the telescope 6 is clamped to the base 7.

The base or bed-block 7 is clamped to the receiver ring 4 by means of one or more clamping screws 9 which pass through apertures 10 in the base and are screw-threaded into tapped holes 11 formed in the receiver ring. In many models, the rifle comes from the factory with factory-tapped holes in the receiver ring, and my improved mounting is designed to make use of these factory-tapped holes in securing the base 7 to the rifle.

The upper face 12 of the base is concavely curved to fit the telescope 6, the curvature of said face 12 preferably having the same radius as that of the telescope.

The clamping bands 8 are preferably made of resilient metal and are long enough to extend more than half way around the telescope. The ends 13 of each band are shaped to lie flatly against the base 7, said ends 13 being clamped to the base 7 by means of clamping screws 14. Each clamping band 8 may conveniently be constructed so that it normally has an interior diameter slightly less than the exterior diameter of the telescope 6 so that when the band is applied to the telescope, the resiliency of the band will cause it to hug the telescope. This is advantageous because it reduces the liability that the bands will become lost or misplaced while the telescope is being applied to or removed from the firearm.

Since each band extends more than half way around the telescope the tightening of the clamping screws 14 will cause the band to have an exceptionally effective clamping action on the telescope and will hold the latter firmly to the base.

The screw-receiving openings 10 in the base 7 are counter-bored, as shown at 15, to receive the heads 16 of the screws 9 so that these clamping screws 9 are located below the telescope 6 when the latter is clamped to the concave seat 12.

The base member 7 is so constructed that when it is placed on the receiver ring and clamped thereto by the clamping screws 9, said base will be automatically lined up, thereby obviating the necessity of making any fine adjustments to bring the telescope into proper alinement after it has been attached to the firearm. For this purpose, the base 7 is provided on its under face with a recess 17 which is so shaped that when the base is clamped to the receiver ring, it will have contact with the convex surface of the receiver ring along two spaced lines, one on each side of the base, as indicated at 18 in Fig. 4. The recess 17 in the underside of the base is shown as a concavely curved recess which is curved on a radius smaller than the outside radial dimension of the receiver ring, and with this arrangement, when the base is placed on the receiver ring, it will have a "riding-the-rails" contact therewith along the edges 18 only and will thereby be automatically lined up properly. The attaching of the base to the receiver ring, therefore, involves simply placing the base on the receiver ring and bringing the screw-receiving holes 10 therein into register with the tapped holes 11 in the receiver ring and then inserting the clamping screws. The engagement of the base with the receiver ring along the spaced lines 18 serves to insure that the base member will be properly lined up.

Further, this "riding-the-rails" contact between the base and the firearm increases the stability of the mounting, thereby providing an exceptionally steady support for the telescope. When the clamping screws 9 are tightened, the sharp edges 18 have a biting engagement with the receiver ring which helps to hold the base steady.

The base having the foregoing construction can be used with rifles having receiver rings of different sizes and as long as the radius of the receiver ring is greater than the radius of the curvature of the recess 17, said base 7 will engage the receiver ring along the two lines 18 only, and will be spaced from the receiver ring between said lines.

This is illustrated in Fig. 12 wherein the full curved line and the dotted curved line represent portions of two receiver rings of different sizes, each having a radius longer than the radius of the curvature 17 formed in the underside of the base 7. In the case of the receiver rings of both sizes, the base 7 will rest on and have engagement with the receiver ring along the two lines of contact 18 only, and the under face of the base will be spaced from the receiver ring between said lines of contact.

With this construction wherein the base member engages the convex curvature of the receiver ring along two spaced lines only, the mere act of placing the base member on the receiver ring will serve to line the base member up properly.

It will be understood, of course, that if the rifle does not come from the factory with factory-tapped holes 11, then it will be necessary to provide the receiver ring with such tapped holes in order to secure my improved sight mounting thereto.

Another feature of the invention relates to a construction by which the recoil of the gun, when the latter is discharged, is transmitted to the base 7 by means other than the clamping screws 9 so that said screws are relieved from any recoil strain and have no duty other than to hold the base 7 in firm engagement with the receiver ring.

In the construction shown in Figs. 1 to 5, the base extends rearwardly beyond the end 19 of the receiver ring as shown at 20. The recess 17, however, terminates at the end of the receiver ring, thereby forming a depending shoulder 21 which engages the rear end of the receiver ring, as best seen in Fig. 2.

When the gun is discharged, the recoil is to the left in Fig. 2, and because of the engagement of the lug or shoulder 21 with the receiver ring, such recoil will be transmitted to the base 7 directly through the shoulder 21. The screw-receiving openings 10 in the base 7 are preferably made somewhat larger than the screws 9, so that said screws will not be subjected to any recoil strain.

In the construction shown in Figs. 1 to 5, the base 7 is formed with the two side faces 22 which incline downwardly and outwardly from the edges of the seat 12 and to which the feet 13 of each clamping ring 8 is secured, these feet being bent outwardly. The faces 22 are shown as having a right angular relation such that if the surfaces were extended, they would intersect at the center of the telescope 6 and this produces a curved seat 12 which has approximately a 90° span.

In Figs. 1 to 5, the two clamping bands 8 are secured to a single base. In Fig. 6 I have shown an embodiment of the invention wherein the two clamping bands are secured to separate base elements which may be widely spaced apart. In said figure, 1a represents a rifle having the usual barrel 3a, and 6a represents the telescope sight. In this embodiment the sight mounting comprises the two relatively short base members 7a, each having the concavely curved seat 12a to receive the telescope 6a, and the telescope is clamped to the seat 12a by a flexible metal band 8a which encircles the telescope and the ends 13a of which are clamped to the inclined surfaces 22a of the base by means of clamping screws 14a.

Each base element 7a is concavely curved on the underside and is shaped on its underside to present a recess having a cylindrical curvature on a radius less than that of the barrel 3a, so that when the base member 7a is placed on the barrel, it will contact therewith along the two lines of contact 18a. 9a indicates a clamping screw by which the base member 7a is clamped to the barrel 3a, the head 16a of the clamping screw being received in a recess 15a formed in the base member 7a. The two base elements 7a may be placed in any desirable position along the barrel 3a, and because of the special construction of said base elements, each will be properly lined up when it is applied to the barrel so that when the telescope sight 6a is placed in position on the base member 7a and clamped thereto, said telescope sight will be properly lined up, thus obviating any process of making a final adjustment of the postion of the telescope after it has been secured to the barrel.

In Fig. 9 I have shown an embodiment of the invention which is similar to that shown in Figs. 1 to 3 in that the two clamping bands 8b are secured to a single base element. In said Fig. 9, 3b represents the barrel of the firearm and 6b the telescope sight. The mounting for the sight 6b comprises the base member 7b which is clamped to the barrel 3b by the clamping screws 9b. The underface of the base 7b is concavely curved on a curvature having a radius shorter than that of the barrel 3b so that when the base is applied to the barrel, it will contact therewith along two edges only, as shown in Figs. 4 and 8, and will be spaced from the barrel between the edges. In this way, the base member is automatically given the correct alinement by simply placing it on the barrel and tightening the clamping screws 9b. In Fig. 9 the clamping bands 8b are similar in construction to those shown in Figs. 1 to 7.

In the embodiment shown in Fig. 9, there is employed a recoil pin 23 which is screwed into the barrel 3b and which fits tightly in a hole 24 formed in the base 7b. The holes 10b through which the clamping screws 9b extend are preferably somewhat larger than the screws, and with this construction, the recoil of the gun will be transmitted to the base 7b through the recoil pin 23, instead of through the clamping screws 9b.

In Fig. 11 there is shown a modified form of the invention wherein the base member 7c has straight vertical sides 26 and the ends 27 of the clamping band 8c are vertically disposed and are clamped to the vertical sides 26 by means of clamping screws 28. The base member 7c, shown in Fig. 11, may be secured to the barrel 3c of the gun in any approved way as by means of clamping screws similar to the clamping screws 9.

Fig. 10 illustrates a different embodiment of the invention wherein the screws which clamp the clamping band to the telescope are also used for clamping the base to the barrel. In this embodiment the base of the mount is shown at 7d and the telescope at 6d. 8d represents the clamping band which clamps the telescope to the base 7d. The clamping band is secured to the base 7d by screws 29 which are long enough to extend through the base 7d and to be screwthreaded into the barrel 3d, as illustrated. In other respects, the construction shown in Fig. 10 is similar to that illustrated in the other figures.

In Figs. 13 and 14, I have shown still a different embodiment of the invention wherein the base member is clamped to the barrel of the gun by means of a clamping band similar to that employed for clamping the telescope sight to the base.

In this embodiment, the base member of the sight mounting is indicated at 7e and it is clamped to the gun barrel 3e by means of a clamping band 30 of resilient metal. The base 7e is shown as having the two inclined surfaces 31 adapted to receive the feet or ends 32 of the clamping band 30, said feet being clamped to the base member 7e by clamping screws 33. The telescope sight in Figs. 13 and 14 is indicated at 6e and it is clamped to the base 7e by a clamping band 8e similar to the clamping band shown in other embodiments of the invention.

If a recoil pin such as shown in Fig. 9 is used in connection with the base member 7e, shown in Figs. 13 and 14, said recoil pin will function not only to transmit the recoil of the firearm directly to the base 7e, but it will also hold the base from slipping sidewise out of proper position.

Where the base is held to the firearm by the clamping screw 9, such clamping screw serves this latter purpose.

It is sometimes desirable to remove the telescope sight from the gun so that the latter may be shot with the usual iron sights, and one advantage derived from making the clamping bands of resilient material, and with an internal diameter slightly less than the diameter of the telescope, is that when the telescope is removed from the base member, the resiliency of the clamping bands causes them to hug the telescope with sufficient friction so that they will maintain their proper position on the telescope when it is temporarily set aside while the gun is being shot with the usual iron sights, and when the telescope is replaced on the gun again the bands will still have maintained their proper position on the telescope so that when the bands are again clamped to the base, the telescope will be properly positioned without necessitating any adjustment.

The construction of the clamping bands is such that when the telescope with the bands thereon is first placed on the base the end portions only of the feet 13 will contact with the base. When the screws 14 or 14a are screwed into the base, the tightening of the screws draws the end portions 13 of the clamping band flatly against the flat face of the base, thereby causing the band to have a superior clamping action on the telescope.

Although I have herein shown my improved mounting as used in connection with firearms having a cylindrical barrel or cylindrical receiver ring, yet the invention is equally adapted for use in connection with firearms in which the barrels or receiver ring is polygonal in cross-sectional shape.

I claim:

1. A telescope mount for firearms which have a convexly-curved mount-receiving surface extending lengthwise of the barrel, said mount comprising a supporting base having its under face concavely curved on a radius less than that of the convexly-curved mount-receiving surface of the firearm, whereby said base, when assembled with the firearm, will engage the convexly curved surface thereof along two lines of contact only extending lengthwise of the barrel, means to secure said base to said firearm, and means for clamping a telescope to the base.

2. A telescope mount for firearms which have a convexly-curved mount-receiving surface extending lengthwise of the barrel, said mount comprising a supporting base having its under face concavely curved on a radius less than that of the convexly-curved mount-receiving surface of the firearm, whereby said base, when assembled with the firearm, will engage the convexly-curved surface of the firearm along two lines of contact only extending lengthwise of the barrel and the under face of the base will be spaced from said convexly curved surface between said lines of contact, the upper surface of said base being concavely curved to fit the telescope to be mounted thereon and provided with a screw-receiving recess, a clamping band for embracing the telescope and clamping it to the base, and a screw to secure said base to the firearm, said screw having its head received entirely in said recess.

3. A telescope mount for firearms having a convexly-curved mount-receiving surface extending lengthwise of the barrel, said mount comprising a supporting base having its under face concavely curved on a radius less than that of the convexly-curved mount-receiving surface of the firearm, whereby said base, when assembled with the firearm, will engage said convexly-curved surface along two spaced lines of contact extending lengthwise of the barrel, the upper surface of said base having a concavely curved seat on which the telescope is adapted to rest, and said base also having a downwardly and outwardly inclined face at each side of said seat, a resilient clamping band embracing the telescope and having its ends bent outwardly and resting on and secured to said downwardly and outwardly inclined faces, and a clamping screw securing the base to the firearm.

4. A telescope mount for firearms comprising a supporting base having a concave seat to receive the telescope and having a downwardly and outwardly inclined face at each side of said seat, said faces being in planes approximately 90° apart, a clamping screw for clamping the base to the firearm, a resilient clamping band adapted to embrace the telescope and having its ends bent outwardly to form feet which rest against said inclined faces, and means to clamp said feet to said faces.

5. A telescope mount for firearms comprising a supporting base having a concave seat presenting a surface of revolution to receive the telescope, which seat spans an arc of approximately 90°, said base also having a downwardly and outwardly inclined face at each side of said seat, said faces being in planes approximately 90° apart, said base also having a screw-receiving recess in its seat, a clamping screw for clamping the base to the firearm, the head of the screw being received entirely within the recess, a resilient clamping band adapted to embrace the telescope and having its ends bent outwardly and downwardly to form feet which rest against said inclined faces, and means to clamp said feet to said faces.

6. A telescope mount for firearms comprising a supporting base having a concave seat in the form of a surface of revolution to receive the telescope, which seat spans an arc of approximately 90°, said base also having a downwardly and outwardly inclined face at each side of said seat, said faces being in planes approximately 90° apart, said base also having a screw-receiving recess in its seat, a clamping screw for clamping the base to the firearm, the head of the screw being received entirely within the recess, a resilient clamping band adapted to embrace the telescope and having its ends bent outwardly and downwardly to form feet which rest against said inclined faces, said band normally having a diameter slightly less than that of the telescope with which it is to be used, and means to clamp said feet to said faces.

7. A telescope mount for firearms comprising a supporting base having a concave seat to receive the telescope and having a downwardly and outwardly inclined face at each side of said seat, said faces being in planes approximately 90° apart, means for clamping the base to the firearm, a clamping band adapted to embrace the telescope and having its ends bent outwardly to form feet which rest against said inclined faces, and means to clamp said feet to said faces.

8. A telescope mount for firearms having a convexly curved mount-receiving surface extending lengthwise of the barrel, said mount comprising a supporting base having a recess in its under face which extends in a fore-and-aft direction and further having on its under face two spaced ribs also extending in a fore-and-aft direction, means for clamping said base to the firearms with the ribs engaging said convex surface of the firearm along substantially parallel lines extending longitudinally of the barrel, and means for clamping the telescope to the base, the under face of said base being spaced from the firearm between the longitudinally extending ribs.

GEORGE NORMAN ALBREE.